Figure 1:
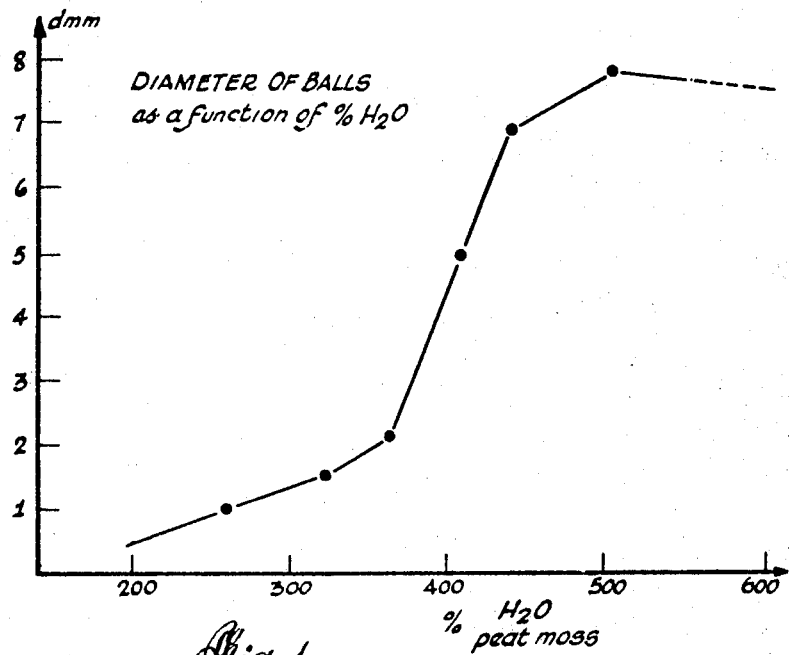

United States Patent [19]
Ruel et al.

[11] 3,844,759
[45] Oct. 29, 1974

[54] AGGLOMERATION AND EXTRACTION OF PEAT MOSS

[75] Inventors: Maurice M. J. Ruel; Aurelio Frederick Sirianni, both of Ottawa, Ontario, Canada

[73] Assignee: Canadian Patents and Development Limited, Ottawa, Canada

[22] Filed: Dec. 5, 1973

[21] Appl. No.: 422,241

Related U.S. Application Data
[63] Continuation-in-part of Ser. No. 179,746, Sept. 13, 1971, abandoned.

[30] Foreign Application Priority Data
Sept. 17, 1970 Canada ..................................093387

[52] U.S. Cl..................... 71/24, 23/312 A, 23/313, 71/64 DA
[51] Int. Cl. ............................................ C05f 11/02
[58] Field of Search............23/313, 312 A; 71/24, 71/64 DA; 260/515 H

[56] References Cited
UNITED STATES PATENTS

| | | | |
|---|---|---|---|
| 2,992,093 | 7/1961 | Burdick | 71/24 |
| 3,252,769 | 5/1966 | Nagelvoort | 23/312 A |
| 3,307,934 | 3/1967 | Palmer et al. | 23/313 X |
| 3,398,186 | 8/1968 | Schwartz | 71/24 X |
| 3,637,639 | 1/1972 | Zinniel et al. | 23/312 A |

*Primary Examiner*—Samih N. Zaharna
*Assistant Examiner*—Richard Barnes

[57] ABSTRACT

The invention relates to the production of a peat moss product wherein substantial amounts of the naturally occurring hydrophobic bitumens in the peat moss are removed therefrom by solvent extraction with a hydrophobic liquid and the treated peat moss is simultaneously agglomerated into spherical shapes or balls with water. A fertilizer is desirably incorporated in the balls during agglomeration.

15 Claims, 2 Drawing Figures

AGGLOMERATION AND EXTRACTION OF PEAT MOSS

CROSS REFERENCE TO RELATED APPLICATIONS

This application is a continuation-in-part of our previously filed United States application Ser. No. 179,746, filed 9/13/71 now abandoned.

This invention relates to the treatment of peat moss for production of useful products therefrom. By peat moss when used herein is meant any finely divided form of peat whether it is finely divided as naturally occurring or whether ground to a suitable particle size.

Uses of peat moss for other than fuel and agricultural purposes appear to be minor despite the huge available reserves of this material.

For agricultural purposes, peat moss is in widespread use as a soil conditioner although it has substantially no food value for plants.

Naturally occurring peat contains about 90 percent by weight of water. Drying it for use as a fuel or as a soil conditioner, as well as for convenient packaging and transportation, constitutes a major problem.

About 80 percent of the peat reserves in the U.S.A. occur in the northern and north-eastern states, particularly in the region of the Great Lakes. Michigan, Minnesota, Wisconsin and Florida have about nine-tenths of the total known reserves. Significant reserves also occur in Maine. With recent changes in the energy and petroleum supply situation the more accessible peat reserves are becoming interesting as potential sources of chemical raw materials as well as soil amendments and fuel.

Dried peats consist of plant fibers which contain about 80 percent holocellulose (i.e., hemicellulose and cellulose materials), some lignin, humic materials, tannins, bitumens, waxes, resins and a small amount of ash. Extraction of these latter substances, using conventional methods of liquid-solid extraction procedures, has heretofore been attempted but, from a practical point of view, it does not appear that any economically feasible manner of utilizing the various components of peat has heretofore been proposed.

Bitumens are fairly easily removed from freshly mined peat, however storing the peat for some time or even drying at about 100°C reduces the yield of bitumen. The crude resin of peat bitumen is easily polymerized. Crude wax is the portion of bitumen which remains when the crude resins are separated from the total peat extract using suitable solvents.

The present invention contemplates the extraction of bitumens, waxes and resins, from peat moss and the simultaneous agglomeration of the peat moss residue into balls or spheres suitable for improved handling and use as a soil conditioner. Various fertilizer materials can also be incorporated "in situ" in the peat moss residue and agglomerated with it into the balls or spheres. End products are, therefore, peat moss with or without fertilizers in convenient shapes and bitumens, waxes and resins.

Peat loses its water repellent property at some moisture content between 45 and 50 percent. Bitumens present in the peat are hydrophobic and impart the water repellent properties to the peat. In the agglomeration process of the present invention, the dispersion media (first and third liquids) wet the water-insoluble bitumens. Simultaneously water wets the peat moss. With suitable agitation in an organic liquid (first liquid) and a sufficient amount of water (second or bridging liquid) peat moss agglomerates into individual sphere-like masses. By varying the volume of water, masses of different diameters are obtained. Too much water will produce a suspension of peat moss in the organic liquid.

The invention therefore comprises forming a mixture of peat moss particles, a first liquid constituting a dispersant for the particles, and a second liquid comprising an aqueous liquid immiscible with the first liquid and which preferentially wets the particles, and subjecting the mixture to shaking or vigorous agitation to agglomerate the particles. A third liquid having strong solvent properties for waxes and resins in the peat moss and preferentially soluble in the first liquid may be incorporated in the mixture.

It is unexpected that agglomeration of peat moss and extraction of bitumens (waxes and resins) can take place in situ with virtually no free water in the first liquid.

Although peat, coal, lignites and the like, all show very high loss on ignition, lignites and coal in particular, are hydrophobic and do not agglomerate when suspended in the first liquid using water as the second, or bridging liquid. Some resin from a resin-bearing coal can be leached out but simultaneous agglomeration of the coal or lignite into sphere-like masses does not take place. In contradistinction to coal, peat agglomerates and releases waxes and resins at the same time using a hydrocarbon liquid to disperse the material and water to collect the particles into agglomerated bodies. The coal can be agglomerated (reversed) when suspended in water using an organic liquid such as heptane, varsol as the bridging liquid but resin cannot be leached out from the coal. Peat does not agglomerate when suspended in water using an organic liquid as the bridging liquid.

Figure 2:
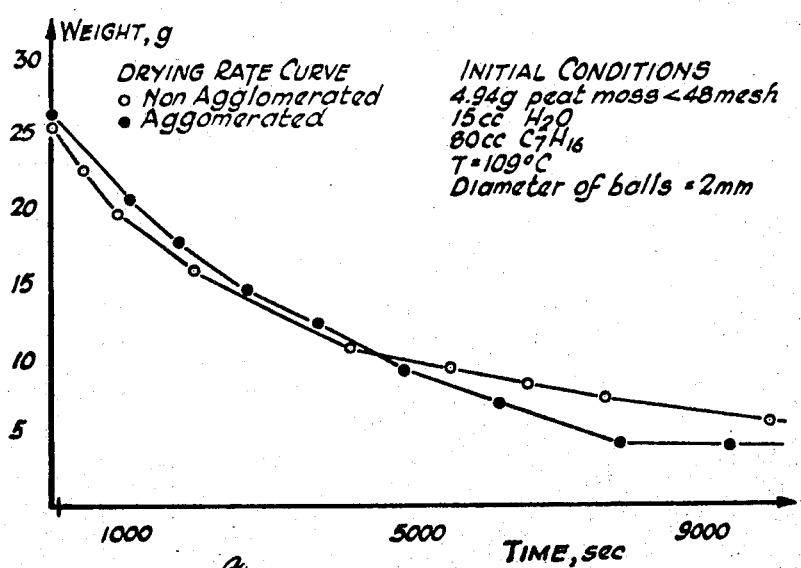

The invention will be described with reference to the accompanying drawing, in which FIG. 1 is a curve illustrating the relationship between the diameter of balls to peat moss produced and the amount of water or aqueous liquid employed, and FIG. 2 is a curve illustrating the drying rate of non-agglomerated peat moss as compared with the agglomerated peat moss of the present invention.

In accordance with the invention, the peat moss employed may be partially dried to about 25–30 percent by weight moisture. Commercial grades are quite suitable with the roots and long fibers removed. The peat moss preferably is ground and screened to minus 8 mesh or finer. While agglomeration to smoother bodies is facilitated with use of finer particles, the invention may be effectively practiced with coarse particles such as those of the order of 8 mesh. However, use of particles of <20 mesh is generally preferred.

The body of peat moss to be treated is placed in any suitable vessel to which agitation, as by shaking or rotating, is to be applied. A conventional pan agglomerator may be adapted for the purpose.

The aqueous liquid is added to the vessel in an amount chosen in accordance with the size of the balls of the end product. Generally speaking, the more water that is added the larger will be the size of balls or pellets produced. FIG. 1 represents the results of experiments conducted with 5g peat moss (48 mesh) and 100 ml heptane for a shaking period of 20 minutes. The amount of aqueous liquid is within about 130 to about 400 percent weight of the dry solids. The preferred range of percentage of water to peat moss by weight is about 150–300 wt. percent. The diameter range of balls or pellets produced varies from 0.5 to 8 mm with increasing amounts of water within this latter range.

The aqueous liquid may comprise not only an available water supply but also any aqueous liquid containing substances that are not incompatible with use of the peat moss agglomerates as a soil conditioner. For instance, some industrial waste liquids, particularly if they contain substances useful as fertilizers or binders, may be employed. Furthermore, in one aspect of the invention, it is proposed to add a fertilizer to the system. It may be added as a solution in the aqueous liquid or dispersed in water as a slurry depending upon the type of fertilizer material used.

The fertilizer could also be added to the body of peat moss as a solid, if desired. Any water soluble or water-wettable fertilizer can be used. The amounts employed will depend upon the nature of the subsequent use of the peat moss product. The criteria for such use will, of course, be the same as that for the fertilizer itself.

Although quite optional, a small amount of a water-soluble or water dispersible binder, such as animal glues and the like, may be added with the water or aqueous liquid. Of course, some of the fertilizers added, such as urea-aldehydes, may have binding properties. Such binders increase the strength of the spheres and make them somewhat more resistant to possible breakage or dusting during packaging and handling.

An organic liquid, which acts as the continuous liquid phase, is added to the mixture in the vessel. It preferably comprises an alkane, or more broadly a petroleum aliphatic solvent having a boiling point range of about 30°–200°C. Thus, heptane is quite suitable for the purpose. Also, the solvent sold under the trade name "VARSOL" is suitable. Other organic solvents which may be used in whole or in part are petroleum ether, cyclohexane, benzene, toluene, xylene, ethylene dichloride, trichloroethylene, and carbon tetrachloride.

The solvent employed as continuous phase dispersant will usually have some extractive effect upon the bitumens, waxes and resins in the peat moss. However, heptane, cyclohexane, and VARSOL are preferred since they result in agglomerates of satisfactory symmetrical form, but these liquids do not remove any substantial quantity of waxes and resins from the peat moss. For this purpose, a minor quantity of a good solvent for waxes and resins such as chloroform, benzene, xylene, toluene, ethylene, dichloride, acetone, ethyl alcohol, isopropyl alcohol and tetrachlorethylene may be added to the main dispersing liquid.

The quantities of continuous phase dispersant (first liquid) and the additional third liquid (if used) for more effective extraction of waxes and resins will vary very considerably with circumstances and conditions of operation. The proportion by volume of peat moss particles may be up to about 35% of the first liquid. The first liquid will ordinarily be used in about 800 to 1,600 percent by weight of the peat moss, and the third liquid in about 10 to 1,600 percent by weight of the peat moss. The third liquid may be in the proportion of 1 to 50 percent by volume of the first liquid (total) in most cases.

The mixture is shaken or otherwise vigorously agitated in a closed vessel for a period of time sufficient to form the peat moss particles into a multiplicity of agglomerates in the form of spheres or balls. Glancing contact of the agglomerates with hard surfaces is desirable. Shaking times of about 2 minutes have been sufficient to agglomerate the particles in laboratory experiments. However, shaking times of up to about 20 minutes may be found desirable under certain conditions. Unless otherwise indicated the peat moss in the Examples had an initial moisture content within about 8 to about 20 percent by weight. Examples to illustrate differences between coal and peat

EXAMPLE 1

A Saskatchewan lignite containing about 10 percent ash was ground to $-270 + 200$ mesh. About 5 g of lignite were mixed with 51 ml hexane (first liquid) and 14 ml water (bridging liquid). The suspension was shaken in a 4 oz. jar for 15 minutes on a paint shaker. The system did not agglomerate. The lignite was dispersed in hexane and only 21 ml hexane was recovered by gravity filtering. This indicates that the surface properties of lignite are not similar to peat.

EXAMPLE 2

Another suspension was prepared as in Example 1, except that 2.05 ml water was used as the bridging liquid. The system was shaken for 15 minutes, but the lignite did not agglomerate.

EXAMPLE 3

| | |
|---|---|
| Lignite ($-270 + 200$ mesh) | 5 g |
| Water | 50 ml (dispersing liquid) |
| Varsol | 2.1 ml (bridging liquid) |

The suspension in water was shaken for 15 minutes in a paint shaker. Small flocs were observed. An additional 0.2 ml Varsol was added to the system, and shaken again for 15 minutes. There was virtually no change in the size of flocs.

EXAMPLE 4

A western Canadian coal containing about 20 percent as ash on ignition was ground to $-270 + 200$ mesh. The following,

| | |
|---|---|
| Ground coal | 5 g |
| Water | 50 ml (dispersion media) |
| Varsol | 2.1 ml (bridging liquid) | was shaken in 4 oz. jars for 15 minutes in a paint shaker. All the coal agglomerated to about 5 mm. diameter pellets. The water contained some hydrophilic siliceous matter in suspension, and on standing the liquid was clear. This experiment indicates that coal, being hydrophobic, is not wetted by water but is easily wetted by the hydrocarbon liquid.

EXAMPLE 5

| | |
|---|---|
| Coal as in Example 4 | 5 g |
| Varsol | 50 ml (dispersion media) |
| Water | 2.1 ml (bridging liquid |

The suspension was shaken on a paint shaker for 15 minutes. Agglomerates of coal were not obtained. The coal being hydrophobic remained in suspension in Varsol.

EXAMPLE 6

| Peat Moss-48 mesh | 5 g |
|---|---|
| Water | 50 ml (dispersion media) |
| Varsol | 12 ml (as bridging liquid) |

The suspension was shaken on a paint shaker for 15 minutes. Agglomerates were not obtained. The peat being hydrophilic remained in suspension in water.

EXAMPLE 7

| Peat Moss-48 mesh | 5 g |
|---|---|
| Varsol | 50 ml (dispersion media) |
| Water | 14 ml (as bridging liquid) |

The suspension was shaken for 15 minutes on a paint shaker. All the peat agglomerated to sphere-like bodies of about 5.5 mm diameter. The filtrate was free of water. A waxy residue was deposited from the colored filtrates on evaporation. The peat being hydrophilic is preferentially wetted by water in an organic liquid.

The following experiments illustrate the agglomerate size that can be obtained by varying the amount of water (bridging liquid).

EXAMPLE 8

| Peat Moss-48 mesh | 5 g |
|---|---|
| Varsol | 50 ml (dispersion media) |
| Water | Variable Amount (bridging liquid) |

The system was shaken in a 4 oz. glass jar for 15 minutes using a paint shaker.

| Water | | Agglomerate Size |
|---|---|---|
| 2 | ml | None |
| 5 | ml | None |
| 6 | ml | 0.2 to 0.3 mm dia. |
| 7 | ml | 0.4 mm dia. |
| 8 | ml | Very uniform about 0.4 to 0.5 mm dia. |
| 12 | ml | 2 mm dia. |
| 15 | ml | mostly 8 mm dia. |
| 17.5 | ml | Agglomerates clustering together |
| 20 | ml | Difficult to differentiate agglomerates |

The peat moss had an initial moisture content of about 8.7 percent. The ash content on ignition was about 1 percent.

EXAMPLE 9

About 5 g peat moss −48 mesh contained in a 4 oz. glass jar was wetted with 280% water based on the weight of the moss. About 50 ml Varsol was added to it and the system shaken for 15 minutes on a paint shaker. All the peat moss agglomerated to pellets of about 1.5 mm About 80 g peat were ball-milled in 800 ml water in a porcelain jar using 35 steel and 2 flint balls. The ground peat passed through an 80 mesh screen, filtered and dried, then pulverized to −80 mesh. The material was unctuous when crushed between the fingers. The following, contained in a 4 oz. jar,

| Peat-80 mesh | 6 g |
|---|---|
| Varsol | 50 ml (dispersion medium) |
| Water | 10 ml (bridging liquid) | was shaken for 15 minutes on a paint shaker. All the peat agglomerated to mostly 6 mm dia. pellets. The colored filtrate was evaporated to dryness, and a waxy residue was obtained.

The following are examples of formulations which gave good ball formation and extraction of bitumen on agglomeration. The <48 mesh peat moss was obtained by grinding in a Waring blender for about 5 minutes and passing the ground material through a 48 mesh screen. The peat moss had an ash content of about 0.7 percent. The moisture content was of the order of 9 percent.

| Example No. | Ingredients | Amounts | Shaking Time |
|---|---|---|---|
| 10 | Peat Moss (Premium Standard) <48 mesh | 5 g | |
| | Ethylene dichloride | 1.5 ml | |
| | $H_2O$ | 14 ml | |
| | Heptane | 100 ml | 5 min |
| | Substantially all of the peat moss was agglomerated to 2 mm bodies. The coloured filtrate left a waxy residue of which about 75% of waxes and resins were soluble in ether (20–35% of total waxes and resins). | | |
| 11 | Peat Moss (Premium Standard) <48 mesh | 5 g | |
| | Acetone | 1.5 ml | |
| | $H_2O$ | 14 ml | |
| | Heptane | 100 ml | 10 min |
| | About 88 ml suspension was recovered by gravity filtering. 90% of waxes and resins soluble in ether were extracted, while all the peat moss agglomerated to sphere-like bodies of about 2–3 mm in diameter. | | |
| 12 | The following third solvents for waxes and resins were tested with the results indicated using: | | |
| | Peat Moss (Premium Standard) <48 mesh | 5 g | |
| | Heptane | 100 ml | |
| | $H_2O$ | 15 ml | |
| | Solvent for waxes and resins | 3 ml | 20 min |
| | Results | Extract | % of Waxes and Resins soluble in ether, extracted |
| | Tetrachloroethylene | 0.072 g | 24.8 |
| | Benzene | 0.119 g | 48.6 |
| | Chloroform | 0.061 g | 14.2 |
| | Ethylenedichloride | 0.094 g | 32.4 |
| | All the peat moss agglomerated to about 1 mm dia. pellets | | |
| | Peat Moss (Premium Standard) <48 mesh | 5 g | |
| | $H_2O$ | 14.1 ml | |
| | Xylene | 50 ml | 15 min |
| | Water was added first to the peat moss, followed by xylene. All the peat moss agglomerated into pellets of about 1 mm in diameter. The dispersion media (xylene) was coloured after agglomeration of the peat. A waxy residue amounting to about 2.43%, by weight, based on the weight of peat, was deposited on drying. | | |
| 14 | Peat Moss (Premium Standard) <48 mesh | 5 g | |
| | Cyclohexane | 55 ml | |
| | $H_2O$ | 14.5 ml | 15 min |
| | About 2–5 mm diameter agglomerates were obtained. The dispersion medium was uncolored. | | |

-Continued

| Example No. | Ingredients | Amounts | Shaking Time |
| --- | --- | --- | --- |
| 15 | Peat Moss (ground but unscreened) | 5 g | |
| | Cyclohexane | 50 ml | |
| | $H_2O$ | 14.5 ml | 15 min |
| | The peat moss was completely agglomerated into irregular shaped agglomerates, 1.5–4 mm diameter, with the majority in the 1.5 mm range. The liquid was uncolored. | | |
| 16 | Peat Moss <48 mesh | 5 g | |
| | Benzene | 50 ml | |
| | Water | 14.6 ml | 15 min |
| | The peat moss was completely agglomerated into agglomerates of the order of 3–4 mm diameter. The filtrate had a strawish coloration. A waxy residue was obtained on drying. | | |
| 17 | Peat Moss <48 mesh | 5 g | |
| | Xylene | 50 ml | |
| | $H_2O$ | 14.1 ml | 15 min |
| | All the peat moss was agglomerated into agglomerates of about 1–3 mm diameter. The filtrate was strawish colored. About 2.45 wt % of waxy residue was deposited on drying the filtrate, and about 48 ml of xylene was recovered. | | |
| 18 | Peat moss <48 mesh | 5 g | |
| | Trichloroethylene | 58 ml | |
| | $H_2O$ | 14 ml | 15 min |
| | All the peat moss was agglomerated into agglomerates of about 1 mm diameter. About 33 ml of strawish colored filtrate was dried and a waxy residue amounting to 1.61% by weight based on the weight of the peat moss was obtained. | | |

In the following Examples 19 to 22, fertilizer ingredients were agglomerated in situ with the peat moss. These ingredients were 10 g urea, 10 g KCl, and 10 g $Ca_3(PO_4)_2$ blended together.

| 19 | Peat moss <48 mesh | 5 g | |
| --- | --- | --- | --- |
| | Fertilizer | 5 g | |
| | Heptane | 65 ml | |
| | Water | 14 ml | 15 min |
| | All the peat moss and fertilizer agglomerated to pellets of the order of 1–15 mm diameter, with the majority in the 15 mm range. The filtrate was clear. | | |
| 20 | Peat moss <48 mesh | 5 g | |
| | Fertilizer | 5 g | |
| | Heptane | 64 ml | |
| | $H_2O$ | 11 ml | 8 min |
| | All the peat moss and fertilizer agglomerated to pellets of 4–9 mm diameter, with the majority in the 9 mm range. The filtrate was clear. | | |
| 21 | Similar to Example 20 but 10 ml water was used as the bridging or second liquid. After 8 min shaking, more uniform agglomerates of the order of 7 mm diameter were obtained. Virtually all the peat moss and fertilizer agglomerated. The filtrate was clear. | | |
| 22 | Similar to Example 20 but unscreened ground peat moss was used. After 15 min shaking, agglomerates of the order of 1–9 mm diameter were obtained. Substantially all the peat moss and fertilizer agglomerated. The filtrate was clear. | | |
| 23 | Peat Moss <48 mesh | 5 g | |
| | Carbon tetrachloride | 60 ml | |
| | $H_2O$ | 13.2 ml | 15 min |
| | Substantially all the peat moss agglomerated to agglomerates of about 1 mm diameter. The filtrate had a strawish coloration. On evaporation, a waxy residue was deposited. | | |
| 24 | Peat moss <48 mesh | 5 g | |
| | Ethylene dichloride | 60 ml | |
| | $H_2O$ | 11.2 ml | 15 min |
| | Agglomerates of about 0.5 mm diameter were obtained. Substantially all the peat moss agglomerated. The filtrate was straw colored. On evaporation, a waxy residue was deposited. | | |

Examples 25 to 29 are illustrative of the use of a major proportion of a dispersing (first liquid which is a poor solvent for waxes and resins and a very minor proportion of a good solvent for waxes and resins.

| Example No. | Ingredients | Amounts | Shaking Time |
| --- | --- | --- | --- |
| 25 | Peat moss <48 mesh | 5 g | |
| | Heptane | 60 ml | |
| | Ethylene dichloride | 0.5 ml | |
| | $H_2O$ | 11 ml | 15 min |
| | Agglomerates of about 2 mm diameter were obtained. Substantially all the peat moss agglomerated. The filtrate had a very faint strawish coloration indicating that a small quantity of wax and resin were removed from the peat moss. | | |
| 26 | Same as Example 25 but using about 1 ml ethylene dichloride. The filtrate was slightly more colored than Example 25. Agglomerates were about 2 mm diameter. | | |
| 27 | Same as Example 25 but using about 2 ml ethylene dichloride. The filtrate was more colored than that of Example 26. Agglomerates were about 2 mm diameter. | | |
| 28 | Same as Example 25 but 2 ml acetone was used instead of the ethylene dichloride, and 13 ml water was used. The filtrate was slightly more colored than that of Example 27. The agglomerates were of different sizes ranging from about 2 to 9 mm diameter. Most of the peat moss was in the 9 mm pellet range. | | |
| 29 | Peat moss <48 mesh | 5 g | |
| | Heptane | 60 ml | |
| | Ethyl alcohol | 2 ml | |
| | $H_2O$ | 12 ml | 15 min |
| | The filtrate was slightly straw colored. A waxy residue was deposited after drying the filtrate. Agglomerates of the order of 3–4 mm diameter were obtained. | | |
| 30 | Peat moss –48 mesh | 5 g | |
| | Heptane | 38 ml | |
| | Water | 10 ml | 15 min |
| | Agglomerates of the order of 0.2 to 1 mm diameter were obtained. About 12 ml of liquid filtered freely under gravity. | | |
| 31 | Peat moss –48 mesh | 5 g | |
| | Petroleum ether B.P. 30–60°C | 55 ml | |
| | Water | 10 ml | 7 min |
| | Agglomerates of the order of 1.5 to 2.0 mm diameter were obtained. The filtrate was clear. | | |
| 32 | Further tests to establish wax recovery were undertaken as follows. The peat moss used was of the "blonde" type. The peat moss was ground to –35 mesh. It contained about 15% moisture. The wax content of the peat moss on a dry basis was about 3% as determined by Soxhlet extraction using Trichloroethylene. | | |

Agglomeration tests were carried out as follows:

| | | |
| --- | --- | --- |
| Peat moss | 5 g | |
| Dispersing liquid | 60 ml | |
| Water | 20 ml | as a bridging liquid |

The samples were agglomerated by shaking the suspension for 15 minutes in 4 oz. jars by means of a paint shaker. The organic liquid which served as the wax extractant and dispersion media was recovered by gravity filtering, and the separated agglomerates were not rinsed. The solvent was evaporated and the waxy residue weighed. Typical results are shown below:

| Dispersing Liquid | Varsol | Cyclohexane | Heptane | Trichloroethylene |
| --- | --- | --- | --- | --- |
| % Wax Extracted during agglomeration | 12 | 12 | 9.3 | 54.0 |

To illustrate the effect of the third liquid, experiments were carried out as follows:

| 33 | Peat moss | 5 g | |
| --- | --- | --- | --- |
| | Varsol | 60 ml | |
| | Isopropyl alcohol | (wax solvent used as third liquid) | |
| | Water | 20 ml | |
| | Results: | | |
| | ml Isopropyl alcohol | 0 | 2 |

-Continued

| Example No. | Ingredients | Amounts | Shaking Time |
|---|---|---|---|
| | % wax extracted | 12 | 14 |
| 34 | Peat moss | 5 g | |
| | Heptane | 100 ml | Dispersion media |
| | | 3 ml | third liquid such as benzene, chloroform or ethylene dichloride |

Results:

| Solvent | Heptane | Chloroform | Third Liquid Benzene | Ethylene Dichloride | Tetrachloroethylene |
|---|---|---|---|---|---|
| % Wax extracted | 9.3 | 15.3 | 14.7 | 16.0 | 13.9 |

It will be noted that by employing an appropriate third liquid, an increase in wax extraction from the agglomerated peat moss is possible.

The following additional experiments serve to show that the extraction of wax occurs when the peat moss is also agglomerated in the presence of a fertilizer.

The experiments were conducted with suspensions containing the following ingredients:

| Peat moss | 5 g | (−35 mesh) |
|---|---|---|
| Fertilizer 7–7–7 | 5 g | (−35 mesh) |
| Varsol | 60 ml | |
| Isopropyl alcohol | X ml | (wax extractant) |
| Water | 17 ml | (bridging liquid) |

The results obtained are shown below:
Results:

| ml Isopropyl alcohol (X) | 0 | 2 | 3 |
|---|---|---|---|
| % Wax extracted | 12 | 17.2 | 14.7 |

It is concluded that the presence of a fertilizer does not impede the removal of wax from the peat moss.

The "Brown" peat moss which lies in a strata below the "blonde" peat moss contains about 3.7 percent wax, when exhaustively extracted with Trichloroethylene in a Soxhlet. The peat moss was ground to −35 mesh. Typical agglomeration experiments were conducted as follows:

| Brown peat moss | 20 g | |
|---|---|---|
| Varsol | 240 ml | dispersion media |
| Water | 40 ml | bridging liquid |

The suspension contained in a 16 oz. jar was agitated for 15 minutes in a paint shaker. Agglomerates of the order of 2–7 mm dia. were obtained.

The suspension was filtered and the dispersion liquid evaporated to dryness. About 22.7 percent of the wax was extracted from the peat moss, without rinsing the agglomerated material with fresh Varsol.

It will, of course, be appreciated that the extracted wax can be recovered from the solvent by conventional methods and the solvent recycled. The wax may be used in any one of a multitude of applications well known to those in the art.

It has been noted that when solvents are used to remove at least some of the waxes and resins, the final peat moss product is more easily wetted by water and thus more easily assimilated by the soil. Thus, judicious mixtures of an inert organic liquid, such as heptane, which results in more symmetrical and uniform size agglomerates, and a minor amount of a good solvent for waxes and resins are usually preferred as first liquid, particularly where recovery and recycling are feasible.

It has also been found that agglomerates of peat moss produced in accordance with the present invention may be desired at a faster rate than peat moss in natural powdered or ground condition. To illustrate this fact, a quantity of peat moss (4.94 g) was agglomerated with water and heptane in the manner previously described. The agglomerated peat moss and the liquid left after decantation were placed in an oven set at 105°C. Non-agglomerated peat moss identical with the starting material of the agglomeration procedure was also placed in the same oven. The rates of drying of these two samples were recorded by weighing them at different intervals of time. FIG. 2 illustrates the results.

At the beginning, the two samples dried at an equivalent rate. This is the period where the organic solvent evaporates. Subsequently, the agglomerated peat moss dried at a faster rate.

It is evident that peat moss could be taken from the field at around 80 percent water by weight and subjected to an agglomeration procedure in accordance with the invention, with removal of waxes and resins, and possible addition of fertilizer. The agglomerates could then be advantageously subjected to natural or forced drying. It is to be noted that only 6 g of the dispersing liquid (out of 56 g) remains in the balls after a simple decantation. The water content of natural high-water-content peat moss is preferably reduced to within about 130–350 percent based on the weight of dry solids, for the agglomeration. This can be easily accomplished by physical means such as pressing or squeezing and decanting. Alternatively, dry peat moss, fertilizer solids or binder solids can be added to the wet peat moss to lower the water content relative to the solids to be agglomerated.

With particular regard to the fertilizer product of the invention, it may be noted that many fertilizers are necessarily incorporated in a filler material. The peat moss agglomerates of the present invention could constitute a desirable filler for such fertilizers.

We claim:

1. A method of treating finely divided peat moss which comprises providing a mixture including (a) peat moss particles comprising a hydrophilic matrix and hydrophobic constituents dispersed therein, (b) a first liquid constituting a hydrophobic continuous phase in sufficient amounts to form a fluid slurry with (a), and (c) a second, aqueous, liquid consisting essentially of water which wets said hydrophilic matrix preferentially relative to said first liquid, said second liquid being substantially immiscible with said first liquid and present in an amount between about 130–400% based on the weight of dry solids, agitating said mixture whereby said first liquid leaches at least part of said hydrophobic constituents and simultaneously said second liquid wets said hydrophilic matrix and agglomerates said leach particles and second aqueous liquid into a multiplicity of substantially discrete pellets, and separating said first liquid containing said hydrophobic constituents from said pellets and at least partially drying said pellets.

2. A method of treating peat moss as defined in claim 1, said first liquid being a petroleum aliphatic solvent having a boiling point range of about 30° – 300°C.

3. A method of treating peat moss as defined in claim 1, said first liquid being an alkane.

4. A method of treating peat moss as defined in claim 1, said first liquid being heptane, cyclohexane, benzene, toluene, xylene, ethylene dichloride, trichloroethylene, or carbon tetrachloride.

5. A method of treating peat moss as defined in claim 1, including the step of incorporating in said mixture of particles and liquids, a third liquid comprising a solvent for naturally occurring waxes and resins in said particles.

6. A method of treating peat moss as defined in claim 5, said third liquid being present in the proportion of 1 to 50 percent by volume of said first liquid.

7. A method of treating peat moss as defined in claim 5, said third liquid being benzene, toluene, xylene, ethylene dichloride, trichloroethylene, carbon tetrachloride, acetone, chloroform, isopropylalcohol or ethyl alcohol.

8. A method of treating peat moss as defined in claim 5, said third liquid being soluble in said first liquid but insoluble in said second liquid.

9. A method of treating peat moss as defined in claim 1, the proportion by volume of said peat moss particles being up to about 35 percent of said first liquid.

10. A method of treating peat moss as defined in claim 1, including the step of preparing said peat moss particles by grinding naturally-occurring peat moss and screening the ground peat moss.

11. A method of treating peat moss as defined in claim 10, wherein said peat moss particles have a size of <8 mesh.

12. A method of treating peat moss as defined in claim 10, wherein said peat moss particles are ground to have a size of <20 mesh.

13. A method of treating peat moss as defined in claim 1, wherein said peat moss particles contain up to about 80 percent naturally-occurring water.

14. A method of treating peat moss as defined in claim 1, wherein said peat moss particles contain up to about 30 percent naturally-occurring water.

15. A method of treating peat moss as defined in claim 1 wherein the aqueous liquid is within about 150 to 300 wt. percent.

* * * * *